H. Wells,
Hanging Saws.
Nº 14,480.  Patented Mar. 18, 1856.
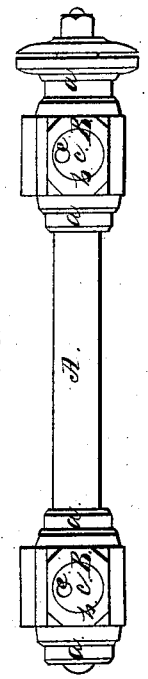
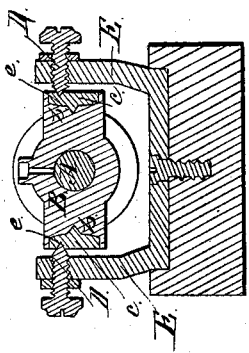
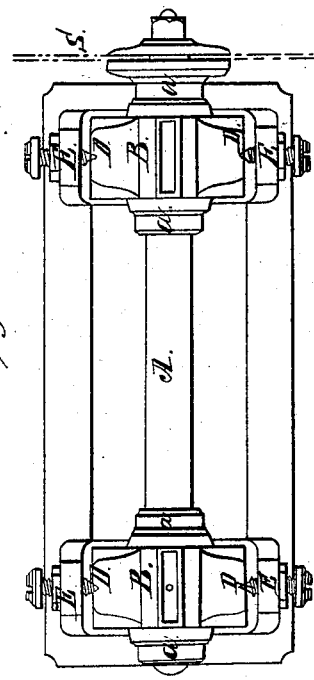
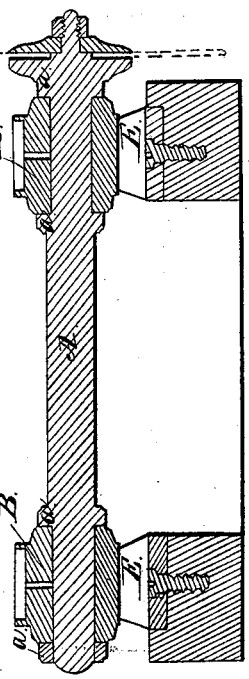

UNITED STATES PATENT OFFICE.

HIRAM WELLS, OF FLORENCE, MASSACHUSETTS.

METHOD OF SUSPENDING CIRCULAR-SAW SPINDLES.

Specification of Letters Patent No. 14,480, dated March 18, 1856.

*To all whom it may concern:*

Be it known that I, HIRAM WELLS, of Florence, in the county of Hampshire and State of Massachusetts, have invented an Improved Mechanism for Admitting and Regulating the Longitudinal Movements of the Spindle of a Circular Saw; and I do hereby declare that the same is fully described and represented in the following specification and the accompanying drawings, of which—

Figure 1, represents a top view of a circular saw spindle as supported in its boxes and provided with my improvement. Fig. 2, is a longitudinal and vertical section of the same. Fig. 3, is a transverse and vertical section taken through one of the boxes. Fig. 4, is a side view of the shaft and its two boxes, the latter being exhibited as removed from their supporting screws.

In sawing timber with a circular saw, it becomes necessary to have some contrivance applied to its spindle in order to allow it to have a sufficient degree of longitudinal play to admit the saw to accommodate itself to the lateral movement or spring of a log while said log is being sawed. For this purpose, sundry devices have been invented and patented, such being either referred to or described in the specification of letters patent granted to me on the tenth day of April A. D. 1855.

In carrying out my present invention or improvement for attaining a like result, I support the saw spindle A, (see Figs. 1, 2, 3 and 4) in two boxes B, B, and provide it with collars or shoulder pieces, *a, a*, to embrace each of the boxes as seen in the drawings and prevent it from sliding endwise through the same. Each vertical side of each box, I provide with a cylindrical recess or chamber, *b*, and a corresponding disk or eccentric, *c*, placed within said recess and having a bearing hole, *e*, made in it near its periphery, or between the same and its axis. This bearing hole is for the purpose of receiving the journal or pointed end of a screw pin, D, which is supported by a puppet or standard E. To each of the said boxes, there are two of said eccentrics and each is sustained by such a screw pin, the boxes being upheld by their respective eccentrics and screw pins. Each puppet where it embraces its box is made wider than the box in order to admit said box, and allow it to be moved or adjusted in a direction transversely of the shaft.

When a saw is affixed to the shaft, it may be supposed to be arranged on it as denoted by dotted lines at S, in Figs. 1, and 2.

By my improved means of sustaining the saw spindle, not only will it be permitted to have all the endwise play that may be necessary to accommodate the saw to the lateral spring of the log, but the weight of the saw, its shaft and boxes will aid in restoring the saw to its normal position.

The eccentrics operate with very little friction and possess decided advantages over springs or many other devices, generally known and applied to the boxes for the purpose of allowing the endwise play or movement above mentioned; and although during the longitudinal movements of the saw spindle it has a vertical movement, its axis always remains horizontal or parallel to the position which it takes when it is depressed to its lowest situation.

What I claim as my invention or improvement is—

The arrangement and application of the eccentrics with respect to the shaft boxes; B, B, and their sustaining and adjusting screw pins substantially in manner and for the purpose as described.

In testimony whereof, I have hereunto set my signature, this fourteenth day of February A. D. 1856.

HIRAM WELLS.

Witnesses:
S. L. HILL,
HIRAM STEBBINS.